May 2, 1967 L. H. SMITH 3,317,879

PRINTED CIRCUIT BOARD CONNECTOR

Filed Sept. 21, 1964

2 Sheets-Sheet 1

INVENTOR

Leslie H. Smith

BY John Todd

ATTORNEY

INVENTOR
Leslie H. Smith
BY John Todd
ATTORNEY

United States Patent Office 3,317,879

Patented May 2, 1967

3,317,879

PRINTED CIRCUIT BOARD CONNECTOR

Leslie Haynes Smith, West Bridgford, England, assignor to United-Carr Incorporated, Boston, Mass., a corporation of Delaware

Filed Sept. 21, 1964, Ser. No. 397,933
2 Claims. (Cl. 339—17)

This invention relates to a board or panel having printed circuitry on at least one face and extending to an edge which is adapted to be received in a board-receiving slot of an edge connector such that when inserted, portions of the printed circuitry make electrical engagement with contacts in the connector.

Such boards may have to be inserted into and withdrawn from edge connectors very many times, and sliding rubbing engagement between the board and contacts during insertion and withdrawal has, in the past, resulted in the circuitry on the board becoming worn or damaged.

The present invention aims to overcome this drawback.

The present invention provides a printed circuit board having an edge portion insertable into a slot in an edge connector provided with resilient contacts for engagement with parts of the circuitry on the board, the board having a width such that it is readily insertable into the slot without making rubbing engagement with the contacts, the board being provided with means operable to effect a transverse movement ofthe board when inserted into the slot to urge it into a position wherein the resilient contacts engage the printed circuitry on the board.

The invention also includes the combination comprising a printed circuit board and an edge connector having a longitudinally extending slot provided with a series of resilient contacts extending inwardly from one side of the slot, the printed circuitry on the board extending to an edge portion of the board which is positioned in the slot, the slot having a width substantially greater than the thickness of the board so that the latter is readily insertable into the slot without making rubbing engagement with the contacts and means being provided for effecting the transverse movement of the board after it has been inserted into the solt so as to urge the board into a position wherein the resilient contacts engage the printed circuitry on the board.

According to one embodiment, the board is provided with a plate-like member slidably mounted on the opposite face to that provided with the printed circuitry adapted to engage the contacts. The arrangement is such that after the board has been inserted edgewise into the slot in the connector, the member is slid over the said opposite face of the board to enter the slot. On entering the slot, the member engages the adjacent wall and exerts a wedging action on the board to move it transversely of the slot so that the board is urged against the contacts of the opposite wall of the slot so that they make intimate engagement with parts of the circuitry.

When the board is to be withdrawn, the member is slid relatively to the board out of the slot and the board can then be removed freely without making rubbing engagement with the contacts.

To enable the invention to be fully understood, it will now be described by way of example, with reference to the accompanying drawings in which.

Figure 1:
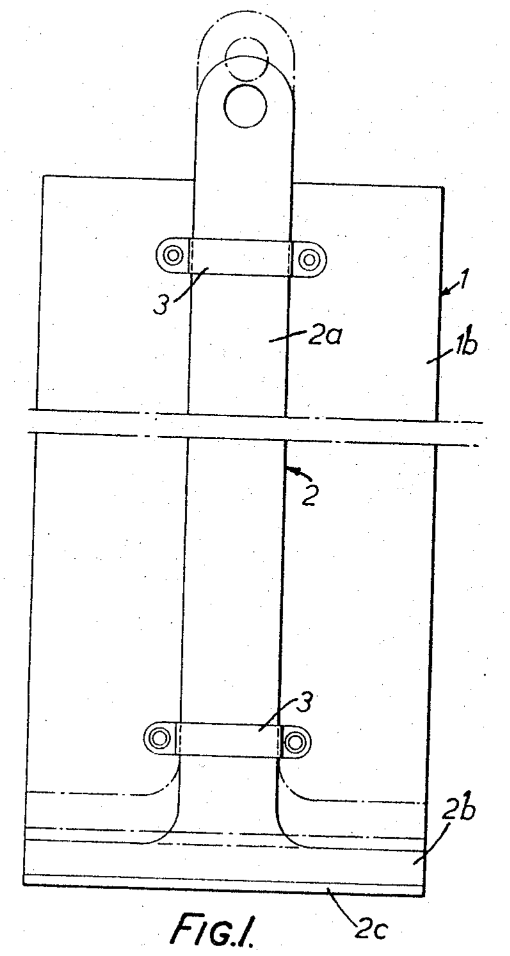
FIGURE 1 is a plan view of a printed circuit board according to one embodiment of the invention.
Figure 2:
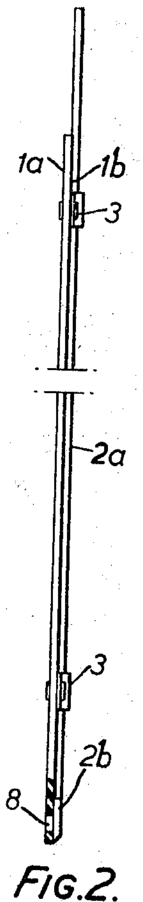
FIGURE 2 is a side view thereof.
Figure 3:
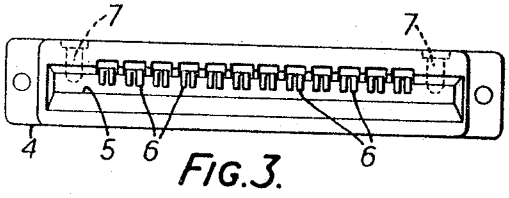
FIGURE 3 is a plan view of an edge connector for receiving the board.

As shown in FIGURES 1 to 3 of the drawings, 1 represents a printed circuit board having printed circuitry (not shown) on the face 1*a*, parts of the circuitry extending to adjacent the lower edge. A member generally designated 2 is slidably mounted on the opposite face 1*b* of the board and comprises an elongated arm 2*a* slidably guided by U-shaped brackets 3 secured to the board 1, and a plate-like portion 2*b* integral with one end of the arm. As shown, the portion 2*b* is the same width as the board and its free edge as beveled at 2*c*.

The board is adapted to be inserted into an edge connector 4, having a slot 5, in which a series of spring contacts 6 are arranged in spaced intervals along one side wall for engaging parts of the circuitry on the face 1*a* of the board. As shown, the width of the slot is substantially greater than the thickness of the board such that the edge of the board can be freely inserted without making rubbing engagement with the contacts 6.

Figures 4, 5:
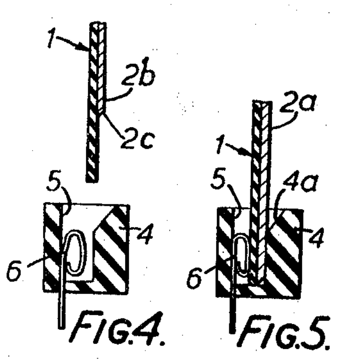
FIGURE 4 is a fragmentary sectional side view of part of the board illustrated in FIGURES 1 and 2, and an edge connector just prior to the board being inserted.
FIGURE 5 is a view similar to FIGURE 4 but showing the board inserted.

Before the board is inserted into the connector, the slidable member is moved into the position shown in FIGURE 4 and indicated in broken lines in FIGURE 1 so that the free edge of the portion 2*b* is positioned in spaced relation to the free edge of the board which is to be inserted into the connector. The free edge of the board is inserted into the slot without making rubbing engagement with the contacts 6, and the arm 2*a* is then actuated to slide the portion 2*b* over the board and into the slot. The sloping portion 4*a* of the connector is engaged by the beveled edge 2*c* of the portion 2*b* to facilitate the entry of the latter.

The movement of the portion 2*b* into the position indicated in FIGURE 5 serves to move the board transversely of the slot 5 to urge the face 1*a* carrying the printed circuitry into intimate engagement with the contacts 6.

As shown in FIGURE 3, pins 7 extend inwardly of the slot adjacent opposite ends to a distance slightly less than the thickness of the board 1, and when the board is moved transversely, these pins engage apertures 8 (FIGURE 2) in the board to lock the board in position. The pins may comprise screws which can be adjusted to determine the extent they project inwardly of the slot 5. If desired, however, the pins 7 may be integrally moulded on the wall of the slot of the connector.

When the board is to be withdrawn, the arm 2*a* is actuated to slide the portion 2*b* out of the slot. The board will then be moved transversely by the spring contacts to dis-engage it from the pins 7, and the board can then be freely withdrawn.

Figure 6:
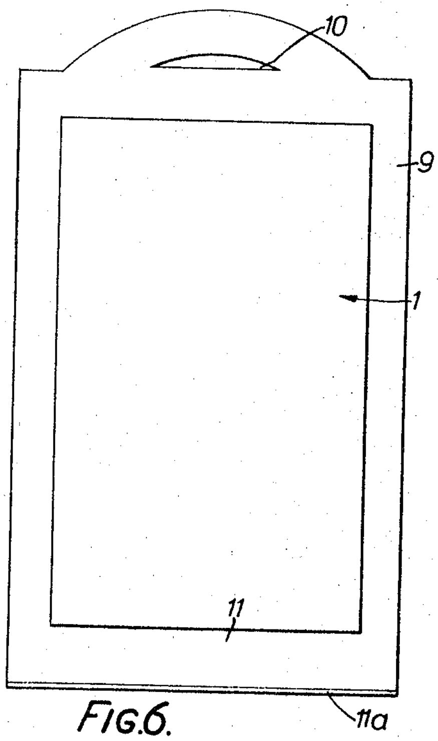
FIGURE 6 is a plan view of a modified form of board.

With reference to the embodiment illustrated in FIGURE 6, a frame-like member 9 is slidably mounted on the printed board 1, and has a finger grip 10 at one end and a plate-like portion 11 at the other end formed with a beveled free edge 11*a*. This embodiment of the invention has the advantage that the central area of the board is exposed to enable components such as capacitors or resistors to be mounted thereon.

Figure 7:
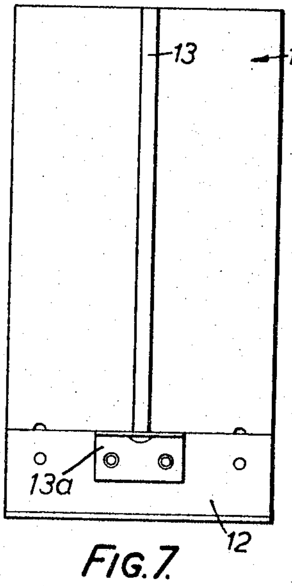
FIGURE 7 is a plan view of a further modified form of board.
Figure 8:
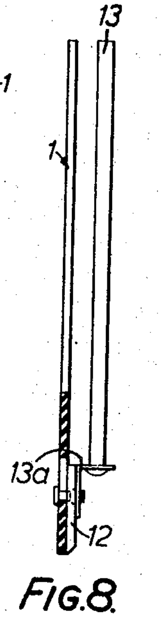
FIGURE 8 is a side view thereof.

According to the embodiment illustrated in FIGURES 7 and 8, a plate-like member 12 is slidably mounted on the edge of a board 1, and is adapted to be actuated by a rod 13 connected to a bracket 13*a* extending outwardly of the board so that the rod 13 is spaced from the adjacent face of the board.

Figure 9:
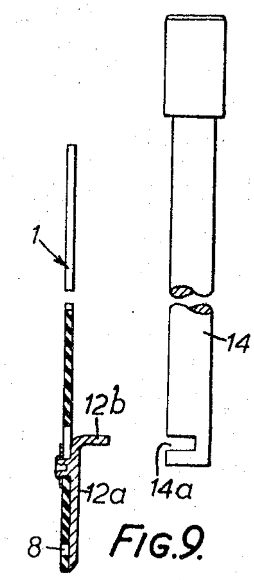
FIGURE 9 is a side view of a still further modified form of board.

The embodiment of FIGURE 9 is similar to that illustrated in FIGURES 7 and 8 except that instead of a rod being secured to the sliding member 12*a*, a separate actuating member 14 is provided having a transverse slot 14*a* at one end adapted to engage a projecting portion 12*b* for effecting the sliding movement of the member 12*a*.

Figure 10:
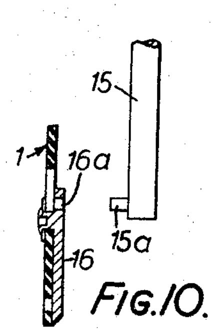
FIGURE 10 is a side view of a yet further modification.

According to the embodiment of FIGURE 10, a separate rod 15 is provided having a pin 15*a* adapted to engage an aperture 16*a* in a slidably mounted member 16.

It will be understood that in each of the embodiments described, the slidable member slides over the board after the latter has been inserted into the edge connector so that the board is moved transversely into engagement with the contacts.

Figure 11:
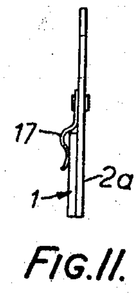
FIGURE 11 illustrates an alternative method of engaging the sliding member to the brackets illustrated in FIGURE 1.

The actual form of the slidable member and the means for actuating it may be varied, for example, instead of the arm 2*a* of FIGURES 1 and 2 being guided in brackets 3, it may be provided with a spring clip 17 (FIGURE 11) adapted to engage over the upper edge of the board.

The plate-like slidable member need not be attached to the printed board and positively guided thereon. For example, the frame-like embodiment illustrated in FIGURE 6 or the rod actuated embodiment illustrated in FIGURES 7 and 8 could be unattached to the board and be adapted to be positioned in sliding abutting relation when the board has been inserted into an edge connector.

In all the embodiments described, the means for actuating the slidable member are so arranged as to be operable from the opposite end of the board to the edge which is to be inserted into the edge connector. The reason for this is that in electrical equipment the edge connectors are not normally mounted in easily accessible positions. The operating means could, however, be located adjacent the edge to be inserted if the connector is in a position where it is easily accessible.

As the printed board and the circuitry thereon will not make rubbing engagement with the contacts, the latter can be made of stouter material than normal and have a much stronger spring action so that when the board is moved transversely, very effective electrical contact with the printed circuit will be obtained.

The plate-like slidable member may be formed of any suitable material, for example, metal, moulded synthetic plastics or a laminate.

I claim:

1. An edge connector having a slot provided with resilient contacts for engagement with parts of circuitry of a printed circuit board, a printed circuit board having an edge portion insertable into said slot, said board having a thickness such that it is readily insertable into the slot without making rubbing engagement with the contacts, a member slidably mounted on said board and arranged to enter the slot in the connector after the edge portion of the board has been positioned in the board, the distance between said resilient contacts and the opposed wall of said slot being less than the thickness of said printed circuit board and said member whereby said printed circuit board is moved into engagement with said contacts when said member enters said slot.

2. An edge connector device according to claim 1, wherein the member comprises a plate-like portion of substantially the same width as the board and located adjacent to the edge portion of the latter which is to be inserted into the slot, the same member being normally disposed in a position wherein it is spaced from the free end of said edge portion and being slidable into overlapping relation to said edge portion after the latter has been inserted into said slot.

References Cited by the Examiner

UNITED STATES PATENTS

| | | | |
|---|---|---|---|
| 2,731,609 | 1/1956 | Sobel | 339—17 |
| 2,857,577 | 10/1958 | Vanderpool | 339—17 |
| 2,888,660 | 5/1959 | Fox | 339—110 |

FOREIGN PATENTS

| | | |
|---|---|---|
| 1,174,063 | 11/1958 | France. |

OTHER REFERENCES

Gallagher, J.: IBM Technical Disclosure Bulletin, December 1963, pages 12 and 13.

MARVIN A. CHAMPION, *Primary Examiner.*

ALFRED S. TRASK, *Examiner.*